(12) United States Patent
Swiger et al.

(10) Patent No.: US 10,184,029 B2
(45) Date of Patent: Jan. 22, 2019

(54) DANDELION PROCESSES, COMPOSITIONS AND PRODUCTS

(71) Applicants: Daniel Swiger, Carlsbad, CA (US); James Wade, San Diego, CA (US)

(72) Inventors: Daniel Swiger, Carlsbad, CA (US); James Wade, San Diego, CA (US)

(73) Assignee: Kultevat, LLC, Carlsbad, CA (US)

( * ) Notice: Subject to any disclaimer, the term of this patent is extended or adjusted under 35 U.S.C. 154(b) by 771 days.

(21) Appl. No.: 13/999,535

(22) Filed: Mar. 7, 2014

(65) Prior Publication Data

US 2014/0370579 A1 Dec. 18, 2014

Related U.S. Application Data

(62) Division of application No. 13/068,283, filed on May 5, 2011, now Pat. No. 9,346,924.

(60) Provisional application No. 61/343,959, filed on May 6, 2010.

(51) Int. Cl.

| | | |
|---|---|---|
| *C08H 8/00* | (2010.01) | |
| *A23L 5/00* | (2016.01) | |
| *C08B 37/00* | (2006.01) | |
| *C13K 1/02* | (2006.01) | |
| *C13K 13/00* | (2006.01) | |
| *C13K 11/00* | (2006.01) | |
| *A23L 29/30* | (2016.01) | |
| *A23L 33/105* | (2016.01) | |
| *A23L 33/22* | (2016.01) | |
| *A23L 33/125* | (2016.01) | |
| *C08L 7/02* | (2006.01) | |

(52) U.S. Cl.
CPC ............... *C08H 8/00* (2013.01); *A23L 5/00* (2016.08); *A23L 29/30* (2016.08); *A23L 33/105* (2016.08); *A23L 33/22* (2016.08); *C08B 37/0003* (2013.01); *C08B 37/0054* (2013.01); *C13K 1/02* (2013.01); *C13K 11/00* (2013.01); *C13K 13/00* (2013.01); *A23L 33/125* (2016.08); *C08L 7/02* (2013.01)

(58) Field of Classification Search
None
See application file for complete search history.

(56) References Cited

U.S. PATENT DOCUMENTS

| | | | |
|---|---|---|---|
| 4,623,713 A | 11/1986 | Beinor et al. | |
| 6,419,978 B1 * | 7/2002 | Silver | ............... C08B 37/0054 |
| | | | 127/29 |
| 7,540,438 B2 | 6/2009 | Buranov | |
| 7,867,545 B2 | 1/2011 | Friedman | |
| 2005/0106215 A1 | 5/2005 | Offord-Cavin et al. | |
| 2006/0225144 A1 | 10/2006 | Hallahan et al. | |
| 2007/0276112 A1 * | 11/2007 | Buranov | ................. C08C 3/00 |
| | | | 528/1 |

FOREIGN PATENT DOCUMENTS

| | | | | |
|---|---|---|---|---|
| WO | WO 2009006715 A2 * | 1/2009 | ............... C07H 3/04 |
| WO | WO 2013/173625 | 11/2013 | |

OTHER PUBLICATIONS

Preus, M. The Northwest Herb Lover's Handbook (2000), p. 115.*
Savage, S. "The State of the Art in the production from Inulin Enzymatic Hydrolysis". Internet Archive Date: Oct. 2, 2007. Retreived from the Internet on: Nov. 26, 2016. Retrieved from: <URL: http://www.redorbit.com/news/business/1086479/the_state_of_the_art_in_the_production_of_fructose/>.*
International Search Report and Written Opinion of the International Searching Authority of PCT/US2011/000804, dated Jan. 12, 2012.
Feris et al., Optimizing Dissolved Air Flotation Design System, Brazilian Journal of Chemical Engineering, vol. 17, n.4-7, Sao Paulo Dec. 2000.

* cited by examiner

*Primary Examiner* — Amy L Clark

(57) ABSTRACT

Dandelion processes, compositions and products are provided. One process is a method of preparing dandelion that utilizes a species of a *Taraxacum* genus, the process including the steps of extracting and recovering a rubber and a carbohydrate from a dandelion root substantially simultaneously. The process employs a dandelion species that is selected from the group consisting of: *Taraxacum officinale, Taraxacum kok-saghyz*, a rubber-bearing species of the genus *Taraxacum*, and a combination of two or more thereof. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

6 Claims, 5 Drawing Sheets

DANDELION PROCESSES, COMPOSITIONS AND PRODUCTS

This application claims priority under 35 U.S.C. § 120 as a divisional of U.S. patent application Ser. No. 13/068,283, filed May 5, 2011, entitled "Dandelion Compositions, Processes and Methods," which claims priority to U.S. provisional application Ser. No. 61/343,959, filed May 6, 2010, entitled "Dandelion Compositions, Processes and Methods", which is incorporated herein by reference in its entirety.

FIELD OF THE INVENTION

The present invention generally relates to extraction processes and product formulations deriving from dandelion (genus *Taraxacum*). The products derived from these processes include, but are not limited to, rubber, sugar syrups, soluble fiber, food, and beverage ingredients.

BACKGROUND OF THE INVENTION

With growing world demand, and difficulties with existing rubber plantation monocultures, there is an urgent world need for alternative, less labor-intensive sources of natural rubber as rubber is a strategic material which is irreplaceable in a variety of applications ranging from surgical gloves to aircraft tires.

For example, all tires made today come from raw latex that is harvested by hand in small cups from Brazilian rubber trees whose bark has been deliberately wounded. This process has not changed in over a century. This laborious effort is carried out almost exclusively in Southeast Asia, where economic development and environmental costs are increasingly making labor more expensive, and the business model less viable.

The monoculture of the *Hevea brasiliensis* tree (i.e., the rubber tree) is susceptible to devastating diseases and blights, which have occurred primarily in its native Brazilian habitat. Additionally, cultivation of *Hevea* has led to a number of environmentally degrading side effects, including the burning of rubberwood for energy needs, and the untreated discharge of latex rubber processing effluents.

World consumption of bulk rubber is forecast to increase four percent annually to 26.5 million metric tons in 2011, mainly due to the growth in Asian motor vehicle production. China is already the leading world consumer of rubber.

One million tons of Natural Rubber Latex (NRL) are imported annually for U.S. consumption, more than half of which is devoted to diverse dipped products (gloves, catheters, condoms, etc.). More than 40,000 products are made with NRL in the U.S., including 39 billion medical exam gloves and 800 million surgical gloves.

No alternative rubber crop has thus far had an integrated system for maximizing the value of all crop co-products. Corn and soybean are examples where such integrated production systems have been developed: both crops are fully utilized in thousands of food, industrial, and animal feed products, and in many cases, both food and industrial products are extracted from the crop in the same manufacturing facility.

Therefore, there remains a need to overcome one or more of the limitations in the above-described, existing art. The discussion of the background to the invention included herein is included to explain the context of the invention. This is not to be taken as an admission that any of the material referred to was published, known or part of the common general knowledge as at the priority date of the claims.

Figure 1:
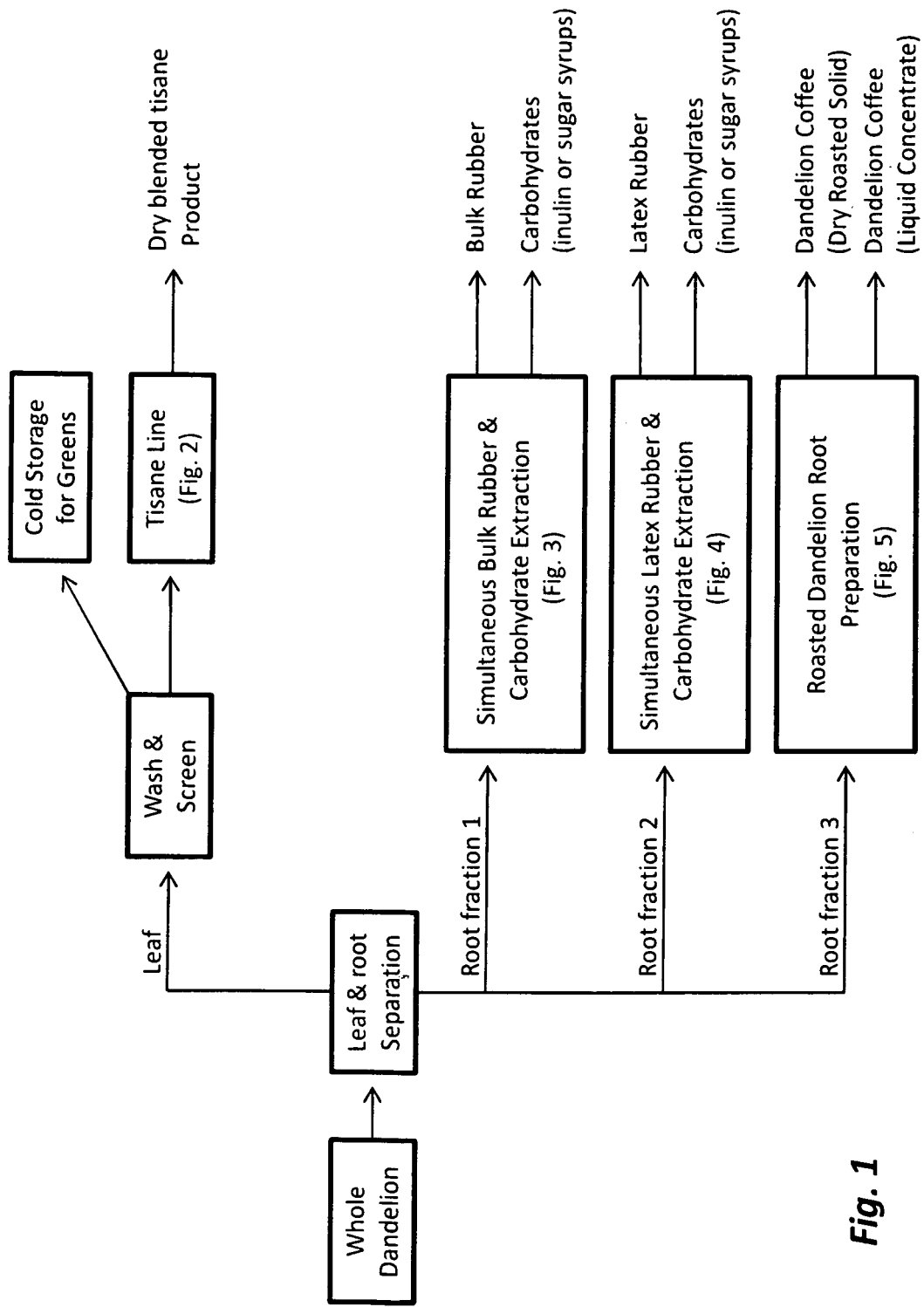
FIG. 1 is a flowchart of an overview of the complete dandelion biorefinery process.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the dandelion biorefinery processes and products of the present invention. It will be apparent, however, to one skilled in the art that the dandelion processes and products may be practiced without some of these specific details. Throughout this description, the embodiments and examples shown should be considered as exemplars, rather than as limitations on the dandelion processes and products. That is, the following description provides examples, and the accompanying drawings show various examples for the purposes of illustration. However, these examples should not be construed in a limiting sense as they are merely intended to provide examples of the dandelion processes and products rather than to provide an exhaustive list of all possible implementations of the dandelion processes and products.

One embodiment of the present invention comprises an integrated extraction process for extracting rubber and other products from dandelion, so that overall crop economics are favorable.

Alternative rubber sources such as guayule (*Parthenium argentatum*) and Russian dandelion (*Taraxacum kok-saghyz*, or TKS) were used successfully during World War II for the manufacture of tires when Asian sources of natural rubber were not available. Because of wartime imperatives, however, optimizing production economics and co-product credits was never a priority for either crop; additionally, both of the allies (the United States in the case of guayule and the Soviet Union in the case of TKS) were able to use the free labor of imprisoned internees for their war production programs. With the rebuilding of Asian rubber plantations in the aftermath of the war, and their superior economics, all domestic rubber programs were abandoned in both the United States and Soviet Union in the late 1940's. Germplasm collections, and the improvements made during that time, were lost for both crops.

Both Guayule and Russian dandelion produce high quality rubber with physical properties and wear characteristics sufficient to be a replacement for tire rubber derived from

*Hevea brasiliensis*, and guayule was able to provide up to a quarter of U.S. military aircraft tires at one time. The favorable properties of tires made from TKS rubber were outlined in the final report of the USDA Emergency Rubber Project (W. G. Whaley and J. S. Bowen, USDA, 1947).

The plant physiology of guayule and Russian dandelion are different. In guayule, latex rubber is produced within the cells of living plant tissue, whereas in the Russian dandelion, latex rubber is produced in lactifer storage vessels within the roots. Thus, the level of plant maceration and cell disruption required to extract TKS rubber is less than it is for guayule. Additionally, TKS dandelion does not have a sticky, low-value resin fraction to process, as does the guayule plant.

During periods of high rubber prices, domestic cultivation of guayule has attracted interest as a potential domestic replacement for rubber derived from Southeast Asian sources of *Hevea*. However, the slow-growing nature of the desert shrub, the lack of domesticated, well-defined germplasm, the difficulty of extracting the rubber, and the problem of how to use all of the bagasse and resin in the plant (90% of its dry weight) rendered guayule uncompetitive in the bulk rubber market.

In the 1990's the epidemic of latex allergy problems presented an opportunity for guayule rubber to be commercialized, since it was discovered that guayule latex was comparable in properties to the *Hevea* latex, but lacked any of the allergic response issues. In the medical field, the materials cost, particularly for a non-allergenic material is of considerably less concern than in the bulk rubber market. Medical-grade non-allergenic latex products could command high enough prices that co-product utilization with guayule was not an urgent issue. However, improved deproteination methods for *Hevea* latex, as well as new synthetic innovations, delivered market solutions to the latex allergy problem before large scale agriculture of guayule could be perfected.

Dandelions are the rubber crop most likely to be amenable to an integrated manufacturing model that fully utilizes and values all parts of the crop, and makes alternative, domestic rubber production economically viable. The rubber from Russian dandelion has already been shown to make high-quality tires. The root is also known to contain inulin, which has health benefits as a soluble fiber ingredient in foods, or can be used as a carbon source for the fermentation of alcohol biofuels. The fiber in the root can also be degraded to its component sugars, and similarly used as a carbon source. The leaves have a long history of food consumption, and are increasingly utilized in gourmet salad blends. Dried leaves can be used in healthy tisane formulations, and roasted dandelion root has a long and rich history of being used as a coffee substitute. Dandelion is also a primary ingredient in a number of herbal remedies and functional foods.

One embodiment of the present invention comprises an integrated dandelion biorefinery process for converting dandelion crops into diverse and differentiated products. While the process produces rubber, it also maximizes the value of the entire dandelion crop as a whole, and thus mitigates economic risk from the fluctuations of commodity rubber markets. Other embodiments of the present invention comprise specific product compositions derived from a integrated biorefinery process disclosed herein.

Embodiments of the present invention may employ the species *Taraxacum officianale* and *Taraxacum kok-saghyz* (Russian Dandelion), and any other rubber-bearing species of the genus *Taraxacum*.

One feature of the present invention comprises biorefinery innovations that comprise an integrated, balanced, and capital-efficient manufacturing process which can be adjusted to derive the maximum value from all parts of the dandelion plant: leaves, stems, flowers, and roots. Such adjustments can be made to satisfy many diverse and fragmented markets, and to quickly shift production resources based upon market demand and the value of different components of the dandelion plant.

Products and processes disclosed herein may be employed by the rubber, food ingredient, beverage ingredient, and biofuels markets where sugar syrups are utilized for production of fuel alcohol. In one process embodiment, all portions of the harvested dandelion crop are converted to one or more such products. Extracted rubber products may include bulk rubber, latex rubber suspensions, or both.

Sugar syrup products may include any mixture of concentrated fructose, glucose, galactose, mannose, xylose, or other sugars derived from the degradation of soluble and insoluble dandelion root fiber. These sugar solutions may be concentrated into syrups with solids content greater than 20%, and serve as a carbon source for the fermentation of alcohol fuels.

Food ingredient products may include products derived from roasted dandelion root or dried dandelion leaf, which are used as ingredients in processed foods, or in nutritional supplements.

Food and beverage ingredient products may include inulin, a fructose polymer. In its high molecular weight form, extracted inulin can be used as a soluble, non-digestible fiber additive, and is particularly well-suited for healthy beverages. In its low molecular weight form, it can be used as a low-glycemic index sweetener in beverages or baked goods.

Beverage ingredients may also include dried dandelion leaf, in a chopped, pulverized, or shredded form that is formulated with other dried plant materials, such as mint, tea, citrus, etc., to create infusible mixtures for making healthy tisane beverages.

Beverage ingredients may also include roasted dandelion root, in a chopped, ground or pulverized form that is formulated with other dried plant materials, such as chicory or barley, to create infusible mixtures. These mixtures are used to make healthy beverage products, both hot and cold, that possess flavor and aroma profiles similar to coffee.

Taken together, the integrated series of processing steps disclosed herein, and the products derived from them, represent an innovation in how rubber can be produced economically, and in how co-products are extracted, refined, and maximally valorized to serve different needs, in a system that mitigates capital risk.

The major components of dandelion root are insoluble fiber, soluble sugars (mainly in the form of inulin), and rubber. Each of these has an economic value which can govern the profitability of the dandelion biorefinery process as a whole. Depending upon the relative value and potential market demand for these three fractions, the extraction and separation steps may proceed by different means, and in different volumes.

Referring now to FIG. 1, the overall process flow is illustrated. After dandelion harvest, root and leaf separation occurs, after which the leaf can be fractionated into two different production processes, and the root can be fractionated into three different production processes.

Figure 2:
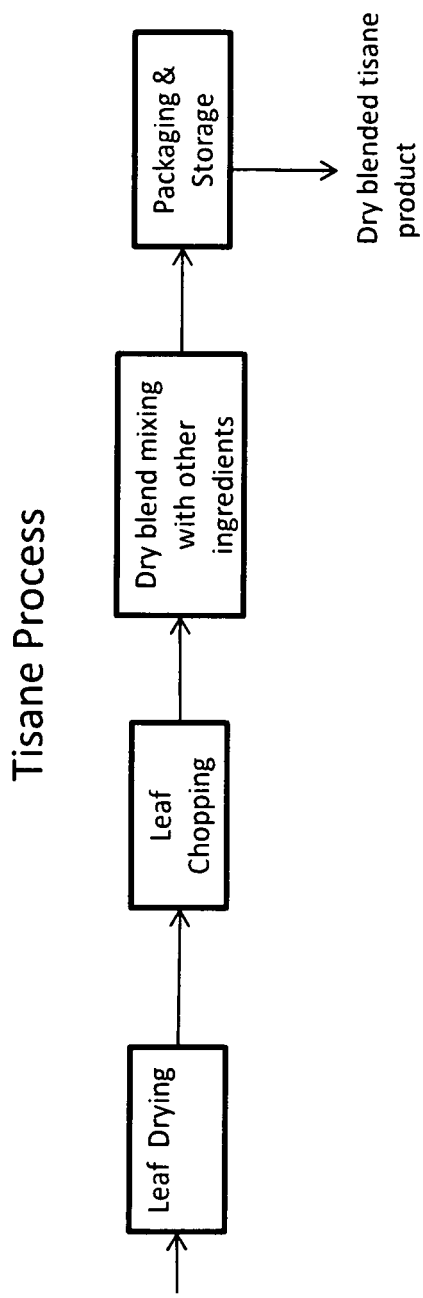
FIG. 2 is a flowchart of a tisane production process utilizing dandelion leaf.

Leaf production is the simplest, in that it can either be allocated for salad production (washing and refrigerated storage), or dried and formulated into tisane blends. The latter process is illustrated in FIG. 2.

Figure 3:
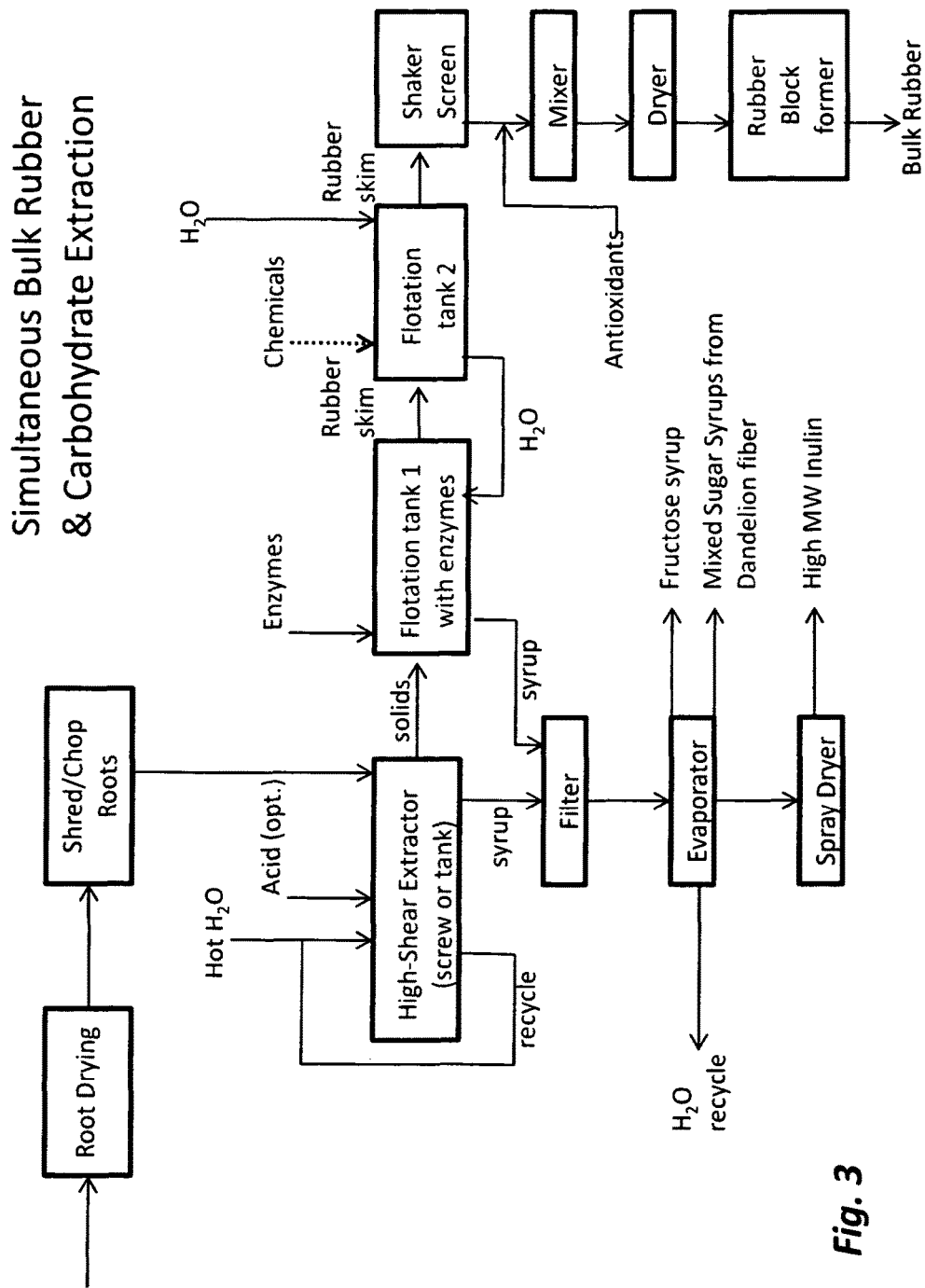
FIG. 3 is a flowchart of a production process for bulk rubber, sugar syrups, and inulin, utilizing dandelion root.
Figure 4:
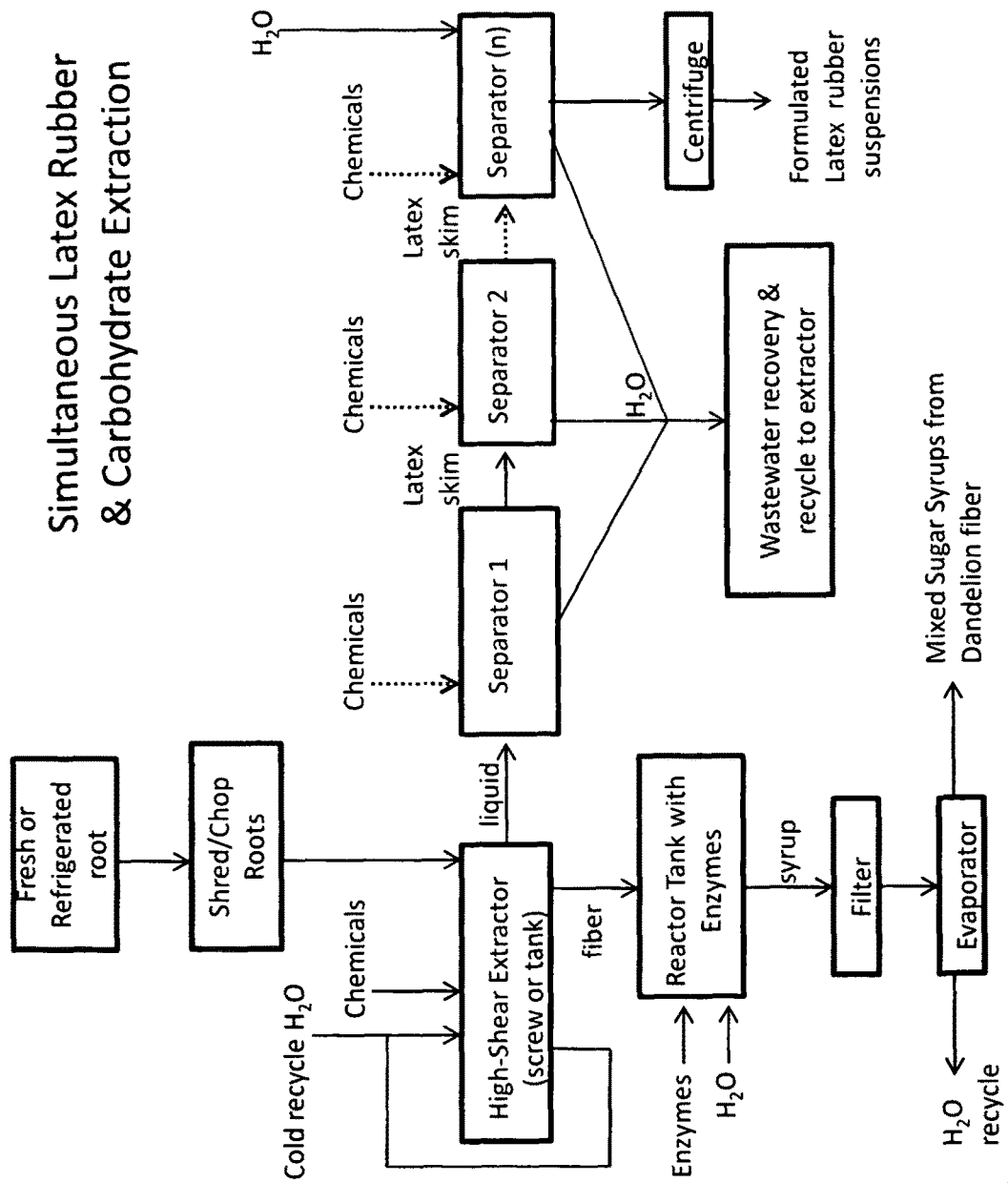
FIG. 4 is a flowchart of a production process for latex rubber and sugar syrups, utilizing dandelion root.
Figure 5:
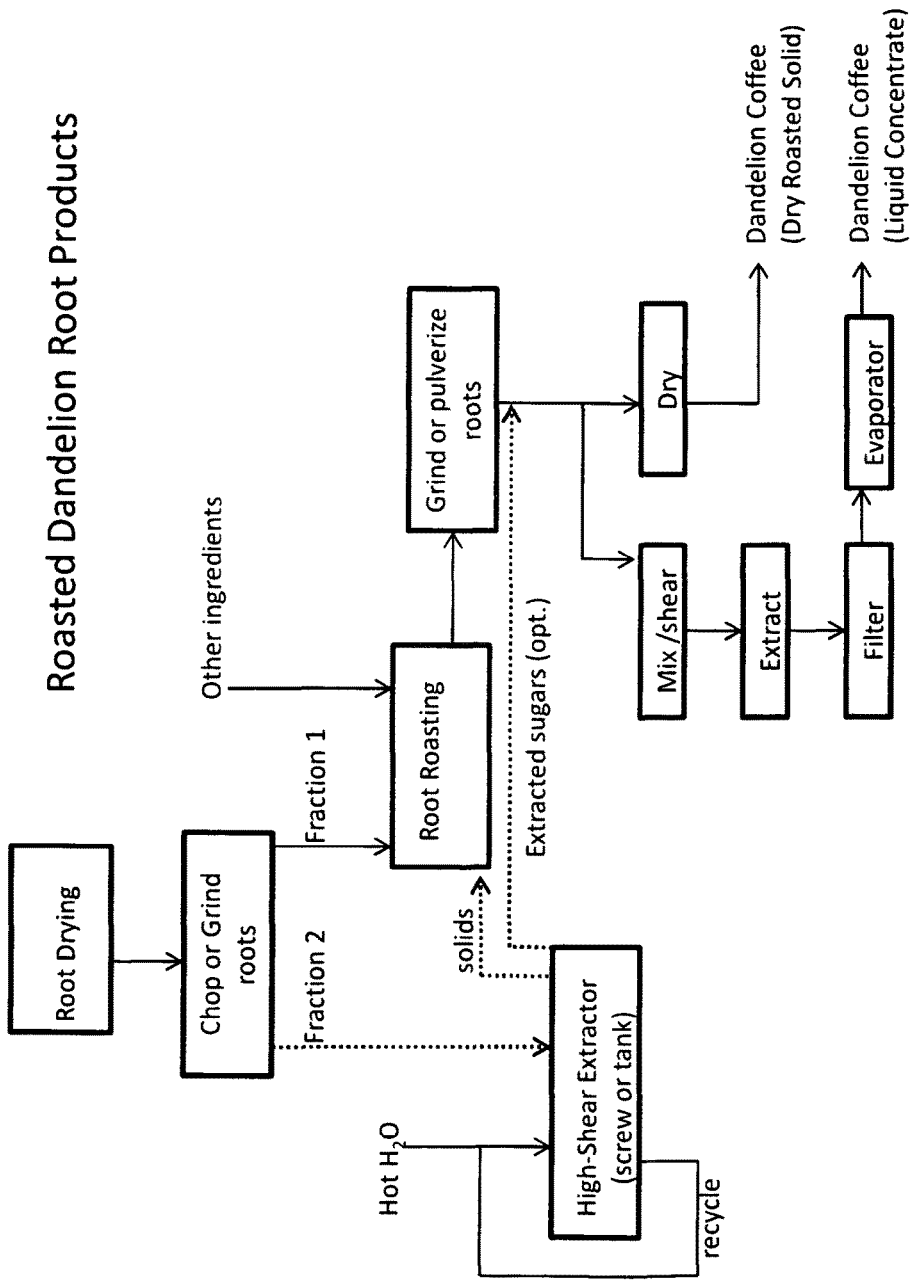
FIG. 5 is a flowchart of a production process for roasted dandelion root products for food and beverages.

Dandelion roots are processed by one of three methods: (1) simultaneous extraction of bulk rubber and carbohydrates, which is illustrated in FIG. 3; (2) simultaneous extraction of latex rubber and carbohydrates, which is illustrated in FIG. 4; and (3) production of roasted dandelion root products for use as food and nutritional ingredients, or in coffee-substitute beverages, which is illustrated in FIG. 5. The first two of these processes are suitable for rubber-bearing dandelion crops, such as *Taraxacum kok-saghyz*, whereas the latter process is most appropriate for non-rubber-bearing dandelion crops, such as *Taraxacum officinale*.

In one embodiment of the present invention the processes discussed above may all share a common base of standard processing equipment. This equipment can be allocated and utilized in one or more of the disclosed processes, in a flexible manner, so that the overall product value is maximized, and the capital resources are utilized in the most efficient manner possible. For instance, chopping, shredding, and drying equipment can be used in any of the processes, at different times, and for different types of dandelion crops (rubber-bearing or not). Most of the same extractor and separator equipment utilized in the bulk rubber process can also be used in the latex rubber process.

In another embodiment of the present invention the individual processes depicted in FIG. 1 are scalable, so that smaller, higher-value products can be produced, such as tisane beverage blends, while at the same time, much larger-volume products, such as bulk rubber, may also be produced.

Referring again to FIG. 1, extraction and recovery of the leaf, rubber, and carbohydrate fractions is comprised of the following steps. These steps are carried out in various combinations and in different order, depending upon the desired volume and desired properties of the target products:

FIG. 1 illustrates leaf removal and processing, and additional steps. Leaves are separated at time of harvest, passed over a screen, and cleaned with a water wash and compressed air to remove residual soil and plant matter. If intended for human consumption as salad greens, the leaves are placed immediately in cold storage in the same manner as lettuce. All other dandelion greens are diverted to a tisane manufacturing line, where they are washed with water, dried at a temperature between 60° C.-105° C. until the moisture level is reduced to less than 10% by weight, chopped to a mean particle size of 1-5 millimeters, and then formulated with other similarly prepared, dried plant materials to form a dehydrated tisane blend. When packaged appropriately, and then infused with water in a suitable straining system, these blends may then be used to prepare either fresh or bottled tisane beverages.

Root cleaning is performed as follows: Prior to further processing, all harvested roots are passed over a screen, and cleaned with a water wash and compressed air to remove residual soil and plant matter.

Root storage and drying is also performed. These operations are carried out differently depending upon the targeted application of the crop being harvested. For bulk rubber, roots would be dried immediately to coagulate the rubber and reduce the water content. Drying is carried out at a temperature between 60° C.-105° C., until the moisture level is reduced to less than 10% by weight, with root being stored in low-humidity chambers at ambient temperatures. This drying and storage process would also be used for root which is destined to be made into coffee-substitute beverage products. When extracting latex rubber suspensions from dandelion, the root is stored in refrigerated conditions as soon as possible after harvest, at a temperature of 4° C.±2° C., and processed as quickly as possible to prevent coagulation of the rubber. Either form of root storage is appropriate for recovering various valuable carbohydrate fractions, ranging from sugar syrups to inulin.

Mechanical root degradation is also performed as illustrated by the Shred/Chop Roots function blocks in FIGS. 3-5. Breaking up root material is a pre-requisite for the efficient extraction of rubber and carbohydrate fractions, and the preparation of roasted root products. For any embodiment pertaining to the extraction of rubber and carbohydrates, roots are chopped, sliced, or preferably, shredded to particles or slender strings with a diameter of 2 millimeters or less. For any embodiment involving roasted root products, the roots are chopped, sliced, or ground prior to roasting, with a mean particle size of between 300-5000 microns. In some embodiments, roots can also be ground or pulverized after roasting, depending upon the desired flavor properties of the target product, to a mean particle size between 300 and 1000 microns.

FIG. 3 illustrates the simultaneous extraction of bulk rubber and carbohydrates. In one embodiment, bulk rubber extraction utilizes dried root, where the rubber has already been coagulated by the drying process. The first step of the process is to mix the chopped or shredded root with hot water at a temperature between 40-70° C., and in the preferred embodiment, shear the slurry in a counter-current, single or double-screw extruder. Another embodiment envisions a continuously stirred tank reactor operating under high shear conditions. By varying the liquid-to-solid ratio between 5:1 and 25:1, and recycling the hot extraction water to extract incoming fresh root material, solutions of high molecular weight inulin are concentrated in the extraction process. In one embodiment, high molecular weight inulin is recovered in solid form by the use of evaporators or spray drying equipment. In an alternative embodiment of the simultaneous bulk rubber and carbohydrate extraction process, the extraction solution is both hot and acidic, with a pH below 4.0, and a temperature above 70° C., so that the extracted inulin is degraded below a molecular weight of 1,000. In this latter embodiment, contact times in a high-shear reactor may be 20 minutes or greater to ensure degradation of the inulin polymers. From this latter process, fructose is recovered as fermentable concentrated syrup, with solids content greater than 20% after evaporation. In preferred embodiments for the recovery of carbohydrate syrups, thin film evaporators would be used in the evaporation step.

Regardless of the extraction equipment utilized in the forgoing extraction step, all solid materials—coagulated rubber and plant fiber—are passed out of the extraction unit into a series of two or more flotation tanks. In the preferred embodiment, these flotation tanks utilize diffused air flotation (DAF) to float the rubber particles to the surface, and a liquid-to-solid ratio less than 25:1 in the first tank. In a preferred embodiment, the first flotation tank contains one or more cellulase, xylanase, or hemicellulase enzymes operating at a temperature between 40-70° C., and a pH between 4.0 and 8.0. This enzyme mixture degrades insoluble dandelion root fiber to its component sugars, mainly glucose. As enzymatic degradation of the dandelion fiber progresses in the first flotation tank, the increasingly concentrated sugar solution is periodically passed through a filter, and sent to the evaporation unit to prepare fermentable mixed sugar syrups. Concomitant with this, make-up water is drawn from the second flotation tank, which itself is replenished with fresh water. In another embodiment, fiber-containing subnatant from the first flotation tank can be cycled into auxiliary tanks or holding ponds (not shown) containing cellulase enzymes, in the event that large volumes of plant fiber require additional contact time for cellulase degradation. In a further embodiment, fiber-containing subnatant from the first flotation tank can be cycled into auxiliary tanks containing acidic solutions with a pH less than 4.0 and a temperature greater than 80° C. This embodiment allows for greater contact times and more rigorous degradation conditions. In either embodiment utilizing auxiliary degradation tanks (enzyme or chemical treatment), the resulting sugar solution may be pH-adjusted and concentrated to produce a fermentable syrup. As the sugar recovery is progressing in this manner, solid, coagulated rubber is simultaneously skimmed from the surface of the first flotation tank and passed to the second tank, where in a preferred embodiment, the liquid-to-solid ratio is less than 10:1. Rubber is once again floated to the surface in the second tank. In other embodiments, additional flotation tank(s) are utilized with decreasing liquid-to-solid ratios, as a means to further concentrate and purify the coagulated rubber, with fresh water being added to the final tank. In additional embodiments, chemicals may be added to one or more of the flotation tanks as process aids, or to ensure rubber quality. Examples of such additions include hydrocolloid coagulants, antioxidants, anti-foam agents, anti-microbial agents, etc. In all embodiments, the solid, coagulated rubber is skimmed from the surface of the last flotation tank, and passed to a shaker screen, where it is given a final wash before having excess water removed by air. The accumulated rubber is then sent to a rubber mixer for a final combination with anti-oxidants, then passed through a drier, and formed into rubber blocks.

FIG. 4 illustrates the simultaneous extraction of latex rubber and carbohydrates. In one embodiment, latex rubber extraction utilizes fresh or refrigerated dandelion root, where the rubber has not been coagulated. The first step of the process is to mix the chopped or shredded root with cold water at a temperature below 25° C. and a pH between 8.0 and 12.0, and in the preferred embodiment, shear the slurry in a counter-current, single or double-screw extruder. Another embodiment envisions a continuously stirred tank reactor operating under high shear conditions at a temperature below 25° C. and a pH between 8.0 and 12.0. The liquid-to-solid ratio is between 5:1 and 25:1, with the preferred embodiment having a liquid-to-solid ratio of 10:1 or less in either type of extraction equipment. In the preferred embodiment of the extraction process, chemicals are added to the extractor to stabilize the latex rubber suspension. Specific examples of the chemicals to be added include ammonium hydroxide and sodium carbonate to adjust the pH, sodium sulfite or hindered phenols as antioxidants, hydrocolloid suspending agents, and commercial antifoam reagents. The latex rubber in the shredded root lactifers is carried away by the high shear and cold extraction water into subsequent separation and concentration stages of the process. In the preferred embodiment, this latex-containing extraction solution is passed through a screen (not shown) which separates any remaining plant fiber. This remaining solid material, which includes almost all of the sugars and fiber in the root, is conveyed to a reactor tank, where all of the remaining material is degraded to its component sugars by means of enzymes. In the preferred embodiment of this invention, the reactor tank contains one or more cellulase, xylanase, hemicellulase, or inulinase enzymes operating at a temperature between 40-70° C., and pH adjusted to a range between 4.0 and 8.0. This enzyme mixture degrades insoluble dandelion root fiber to its component sugars, mainly glucose and fructose. In an alternative embodiment, the degradation conditions in the holding tank would comprise an acidic solution with a pH less than 4.0 and a temperature greater than 80° C.

Regardless of the extraction equipment utilized in the forgoing extraction step, the liquid material containing the latex rubber suspension is passed through a separator screen to remove plant fiber, and then passed on to a series of latex rubber separators. The purpose of the separators is to clean and concentrate the latex rubber suspension to a final concentration of greater than 50% solids. Multiple embodiments of this process would incorporate as few as two, and as many as eight, such separator devices. In a preferred embodiment, the separators are diffused air flotation (DAF) tanks, in which latex rubber is concentrated on the surface by air flotation, skimmed, and passed on to the next flotation tank. In another embodiment, the separators are continuous centrifugal decanters, in which a fraction rich in latex rubber particles is carried downstream to the next separator device, while the water-rich subnatant is carried upstream to the previous separator. In a third embodiment, the separators are quiescent settling tanks. Multiple embodiments of this process may utilize combinations of flotation, decanting separators, or settling tanks in serial combination, and in different orders, depending upon the target properties of the final latex suspension. All embodiments incorporate a decreasing liquid-to-solids ratio in the separators as the series progresses. In a preferred embodiment, the first separator utilizes a liquid-to-solid ratio of less than 10:1, and the final separator utilizes a ratio less than 3:1. All embodiments of the latex recovery process incorporate the ability to add chemicals independently at each separator device, as a means of process and quality control. Specific examples of the chemicals to be added include ammonium hydroxide and sodium carbonate to adjust the pH, proteases to diminish protein content, sodium sulfite or hindered phenols as antioxidants, ammonium alginate creaming agents, anti-microbial agents, and commercial antifoam reagents. In one embodiment, a solids content of greater than 40% is achieved at the end of the separator train. In another embodiment, a solids content of greater than 50% is achieved by means of a final centrifugation step. While latex rubber is being recovered in the forgoing process, sugar syrups are recovered from the reactor tank, where dandelion fiber is degraded by either chemical or enzymatic means. In a preferred embodiment, the contents of the reactor tank are pH-adjusted to approximately 7.0 as they are drained out, and the liquid is passed through a two-stage filtration system, the first stage being a screening filter to remove solid fiber, and the second stage being a 10,000 molecular weight cutoff filter. The retentate fractions of the two filter stages—proteins, enzymes, and polysaccharides—are returned to the reactor tank for further digestion, while the filtrate proceeds to the evaporator for concentration into fermentable sugar syrup with solids content greater than 20%.

FIG. 5 illustrates roasted dandelion root products. Dandelion root is washed, either while it is whole, or in another embodiment, after it has been sliced, chopped, or shredded. In a preferred embodiment, all washed dandelion root is incorporated into fraction 1, which is sent directly to the root roaster. In another preferred embodiment, roasting of the dandelion root or its pieces is carried out in a tumbling drum, either with or without strong convective air flows, at a temperature between 200-650° F. In another embodiment, roasting of the dandelion root or its pieces is carried out with nitrogen/oxygen mixture ranging from 0-50% oxygen to obtain different levels of oxidation of the organic material depending upon the desired taste profile of the intended product. In a further embodiment, the root is separated into two fractions immediately after the washing step. Fraction 1 proceeds to the roaster, while Fraction 2 is sent to a hot water extraction system identical to what is used to extract coagulated bulk rubber. The preferred embodiment of this equipment would be either the single or double-screw countercurrent extruder. This step is used to remove some portion of the available sugars in the roasted product, to prevent formation of off-flavors caused by the formation of Maillard reaction products. In one version of this embodiment, some fraction of the dandelion fiber (Fraction 2) is extracted with hot water, and returned to the roaster with the first fraction of root material, while the extracted sugars are added back into the root mixture at a point following the roasting step. Following the roasting step, roasted root materials are ground or pulverized to a mean particles size between 300-1000 microns. In an alternative embodiment, any extracted sugars from the preceding water extraction of fraction 2 may be added back to create a slurry of dry, roasted ground dandelion particles. Formulation of the final roasted rooted product can be either in a solid or liquid concentrate embodiment. In a preferred embodiment for the dry powder product, the roasted root is packaged immediately after grinding or pulverizing to its target particle size. In another embodiment, where soluble sugars have been added back into the ground roasted root as a liquid solution, the slurry is dried at a temperature between 60° C.-105° C. until the moisture content is less than 10% by weight. In a preferred embodiment of the liquid concentrate product, the dry, ground roasted dandelion root is either slurried with additional water, or slurried with the extracted sugar solution resulting from the earlier extraction of root Fraction 2. The slurry is then placed in an filtered extraction chamber, and the solid material is extracted by pumping hot water through the chamber, at a temperature between 40-100° C., depending upon the desired flavor and aroma profiles of the target product. In one embodiment, this extract is concentrated in a thin film evaporator to a solids content of 20-50%. In further embodiments, other ingredients are added to the concentrate, examples of which include sweeteners, flavors, and texturizing hydrocolloids.

Example 1. Leaf, Tisane, and Dry Roasted Root Products from *Taraxacum officinale*

A crop of *Taraxacum officinale* is harvested, and the leaves and roots are separated and washed. 50% of the leaves are sent to cold storage for subsequent mixing into gourmet salad mixes. The other 50% of the leaves are dried in a convection oven at 90° C., with a residence time of 5 minutes. The resulting dry leaves are chopped to a size of 2 mm, and mixed with smaller fractions of ground citrus peel, green tea leaves, and mint leaves to create an infusible dry powder Tisane concentrate. The washed dandelion roots are chopped to a size of 5 mm, and 70% of this material is sent directly into a rotating drum roaster, where it is roasted at 400° F. for 30 minutes, under ambient atmospheric conditions. The remaining 30% of the root material is extracted in a countercurrent screw extruder, using hot water at a temperature of 60° C. to remove soluble sugars. The extracted fiber from this step is returned to the roaster with the other 70% of the dandelion root. After roasting, the solid material is ground to a mean particle size of 500 microns, and the extracted sugar solution is added to create a slurry. This slurry is mixed well, and dried on a belt drier to reduce the moisture content to less than 10%, prior to packaging as an infusible dry coffee substitute product, as in a tea bag.

Example 2. Tisane and Liquid Concentrate Roasted Root Products from *Taraxacum officinale*

A crop of *Taraxacum officinale* is harvested, and the leaves and roots are separated and washed. All of the leaves are dried in a convection oven at 90° C., with a residence time of 5 minutes. The resulting dry leaves are chopped to a size of 2 mm, and mixed with smaller fractions of ground citrus peel, ground ginger, and dry inulin (produced in Example 3) to create an infusible dry powder Tisane concentrate with soluble fiber to promote GI health. The washed dandelion roots are chopped to a size of 5 mm, and all of this material is sent directly into a rotating drum roaster, where it is roasted at 400° F. for 30 minutes, under ambient atmospheric conditions. After roasting, the solid material is ground to a mean particle size of 500 microns. The dry material is then transferred to the filtered extraction chamber, which on the lab scale could be a drip coffee maker. Hot water at a temperature of 90° C. or greater is pumped through the chamber, and the resulting extract is collected and concentrated to a solids content of greater than 20% by means of a thin film evaporator. Other ingredients are added to the concentrate at this point, including vanilla flavor and pectin as a viscosifier and suspending agent. The resulting concentrate of roasted dandelion root is packaged individually or in bulk, and used to make rich coffee substitute beverages, either hot or cold.

Example 3. Tisane, Bulk Rubber, Inulin, and Sugar Syrups from *Taraxacum kok-saghyz*

A crop of *Taraxacum kok-saghyz* is harvested, and the leaves and roots are separated and washed. The leaves are processed in the Tisane line as specified in Example 2. The cleaned roots are first dried to a moisture content of less than 10%, shredded into thin strings with an average diameter of 1 mm, and conveyed into a single screw counter-current extruder. Inulin is extracted from the shredded root material inside the rotating screw extruder by using hot water at a temperature of 70° C. This water is recycled through the extruder as new material is brought in, until its inulin concentration (as monitored continuously by refractive index) reaches 10%, at which point, it is pumped through a 2 micron filter to a holding tank, and fresh, hot water at 70° C. is replenished in the extruder. To preserve the high inulin molecular weight, the contents of the holding tank are immediately transferred to the thin film evaporator, where the inulin solution is concentrated still further, and then to the spray drier, where high molecular weight inulin is collected in its final dry powder form. This material can be packaged as a food or beverage ingredient, or used in either of the beverage products cited above in Example 1 and Example 2. The extracted root fiber material, which contains insoluble fiber and coagulated rubber, is conveyed out of the screw extruder, and deposited into the first diffused air flotation (DAF) tank. This tank has air diffusers on the bottom creating bubble sizes of 1 mm or less, and also contains a mixture of industrial cellulase and xylanase enzymes for degrading the shredded root fiber material rapidly. The tank is operated at the maximum temperature of the industrial enzymes, which in this example is 60° C., and the optimum pH for the enzymes being used. Air bubbles bring the coagulated rubber particles to the surfaces, where they are removed by means of a skimmer and transferred to the second DAF tank. Sugar concentrations in the first DAF tank are monitored continuously by means of refractive index, and as the concentration of sugar reaches 10%, the subnatant is drained away, filtered through a 2 micron filter, and pumped to the thin film evaporator, where it is concentrated to a solids level of between 20-50%, stored, or used as a carbon source for the production of alcohol biofuels by fermentation. Subnatant drained from the first DAF tank is replaced by water from the second DAF tank, which in turn is replenished by fresh or recycled water. Coagulated rubber particles floated to the surface in the second DAF tank, now much cleaner, are skimmed and transferred to a shaker screen, where they are given a final spray wash, and a compressed air blast to remove excess water. After mixing the rubber particles with antioxidant in a rubber mixer, the rubber is dried and compressed into rubber blocks for storage and shipment.

Example 4. Tisane, Bulk Rubber, and Sugar Syrups from *Taraxacum kok-saghyz*

This example is the same as Example 3, except for treatment of the inulin-containing hot water extract from the screw extruder. In Example 3, this solution resided only briefly in the holding tank, and was conveyed quickly to the thin film evaporator and spray drier for recovery of high molecular weight inulin. In the present example however, the holding tank is held at a temperature of 70° C., and the pH is adjusted to 1.5 with sulfuric acid. This degrades the inulin to fructose, and after a residence time of 45 minutes, the pH of the solution is adjusted to between 6.0 and 8.0 with sodium hydroxide. This predominantly fructose solution is then pooled with the other (predominantly glucose) solutions collected from the DAF tank subnatant, and the mixed sugar solution is concentrated to a syrup of solid content 20-50% in the thin film evaporator. This mixed sugar syrup can then be stored, or used as a carbon source for the production of alcohol biofuels by fermentation.

Example 5. Tisane, Latex Rubber, and Sugar Syrups from *Taraxacum kok-saghyz*

A crop of *Taraxacum kok-saghyz* is harvested, and the leaves and roots are separated and washed. The leaves are processed in the Tisane line as specified in Example 2. The fresh roots are refrigerated at 4° C. for a period of about 6 hours after harvest, then shredded into thin strings with an average diameter of 1 mm, and conveyed into a single screw counter-current extruder. Cold water at a temperature of 20° C. is adjusted to pH 10.0 with ammonium hydroxide, and sodium sulfite is added as an antioxidant. This solution is used to extract the raw latex from the shredded dandelion root inside the screw extruder. This water solution is recycled through the extruder as new material is brought in, in order to concentrate the extracted latex still further. As the latex solids content approaches 10% (as measured by probes such as near-infrared or conductivity), this extraction fluid is diverted through a screen filter into the first separator tank, and is replenished by fresh extraction fluid. Retentate from the screen filter is returned to the counter-current screw extruder, which deposits of all the remaining solids into a reactor tank for sugar recovery. This reactor tank is maintained under similar conditions the first DAF tank cited in Example 3: a mixture of industrial cellulase and xylanase enzymes held at the optimum enzyme pH and a temperature of 60° C. Sugar concentrations in the reactor tank are monitored continuously by means of refractive index, and as the concentration of sugar reaches 10%, the subnatant is drained away, filtered through a 2 micron filter, and pumped to the thin film evaporator, where the sugar syrup is concentrated to a solids level of between 20-50%, stored, or used as a carbon source for the production of alcohol biofuels by fermentation. The latex separation and concentration process begins in the first separator tank, which in the present case is a diffused air flotation (DAF) tank identical to that used in Example 3. In the present case, however, additional monitoring and controls are needed to keep pH in control (10.0±2.0), and to control foaming and potential coagulation issues. Because the latex rubber can be cleanly extracted from dandelion root lactifers, there is little foreign matter even in the first extraction, and this foreign matter is diluted and removed in subsequent separator steps. As cold latex extract is added to the first DAF separator tank, the latex particles are brought to the surface, where a skimmer transfers them to the next separator tank. In the present example, the next separator tank is a centrifugal decanter, which concentrates the latex still further, and transfers the light, rubber-rich phase is to the third stage. The third separator tank in the present example is a quiescent settling tank, into which is added 0.1% ammonium alginate as a creaming agent. Creamed latex is removed from this separator, and concentrated by means of a centrifuge in a final step to a Dry rubber solids content of 50%. The final formulation is adjusted to a pH of 10.0 with ammonium hydroxide, and contains anti-oxidants, anti-microbials, and stabilizers. Excess water from each of these separator stages is recovered and recycled back to the extractor.

Thus, it is seen that dandelion processes, compositions and products are provided. One process comprises a process of preparing dandelion that utilizes a species of a *Taraxacum* genus, the process comprising the steps of: extracting and recovering a rubber and a carbohydrate from a dandelion root substantially simultaneously. The species is selected from the group consisting of: *Taraxacum officianale, Taraxacum kok-saghyz*, a rubber-bearing species of the genus *Taraxacum*, and a combination of two or more thereof. In this process a bulk rubber is first coagulated by air drying of a plurality of dandelion roots. Also, both a coagulated rubber and a water soluble inulin are substantially simultaneously extracted from a plurality of dandelion roots by using water at a temperature above 40° C. Alternatively, a coagulated rubber and a water soluble sugar are substantially simultaneously extracted and separated from a plurality of dandelion roots by an aqueous solution of enzymes, at a temperature ranging between 20 to 70° C., and a pH between 4.0 and 8.0. The bulk rubber is purified and recovered from a plurality of dandelion roots by a series of one or more diffused air flotation steps.

A second process of preparing dandelion that utilizes a species of a *Taraxacum* genus, the second process comprising the steps of: recovering a fermentable sugar syrup from a dandelion, the fermentable sugar syrup having a composition ranging between 5 and 95% fructose, and a remainder selected from a group consisting of: glucose, xylose, mannose, galactose, and a combination of two or more thereof. The dandelion species is selected from the group consisting of: *Taraxacum officianale, Taraxacum kok-saghyz*, a rubber-bearing species of the genus *Taraxacum*, and a combination of two or more thereof. A dandelion carbohydrate product is manufactured, and the dandelion carbohydrate product comprises an inulin possessing a molecular weight greater than 5,000 atomic mass units or a fructose syrup with a solids content greater than 20%. Another dandelion carbohydrate product may be manufactured, and the dandelion carbohydrate product comprises a mixed sugar syrup having a composition ranging between 5 to 95% fructose, and a remainder selected from a group consisting of: glucose, xylose, mannose, galactose, and a combination of two or more thereof. A solids content of the product may be greater than 20%.

A third process of preparing dandelion that utilizes a species of a *Taraxacum* genus, the third process comprising the steps of: extracting a rubber from the dandelion by using a cold water wash, where the species is selected from the group consisting of: *Taraxacum officianale, Taraxacum kok-saghyz*, a rubber-bearing species of the genus *Taraxacum*, and a combination of two or more thereof. In this process the extracted rubber from the dandelion is purified and concentrated to a solids content of greater 40%. The extracted rubber from the dandelion comprises a product that may be used in a manufacture of a tire or an automotive part or a latex rubber used in a manufacture of a medical device or a glove.

The terms "including", "comprising" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise. None of the description in the present application should be read as implying that any particular element, step, or function is an essential element which must be included in the claim scope. The scope of the patented subject matter is defined only by the allowed claims. Moreover, none of these claims are intended to invoke paragraph six of 35 USC Section 112 unless the exact words "means' for" are followed by a participle.

Thus, it is seen that dandelion processes, compositions and products are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

The fact that a product, process or method exhibits differences from one or more of the above-described exemplary embodiments does not mean that the product or process is outside the scope (literal scope and/or other legally-recognized scope) of the following claims.

What is claimed is:

1. A method of obtaining fructose from a dandelion species, the method comprising the steps of:
   a) providing a plurality of fresh or refrigerated dandelion roots containing inulin;
   b) drying the dandelion roots to a moisture content of less than 10 weight %;
   c) shredding the dried dandelion roots into a multiplicity of thin strings, pieces, or particles;
   d) immersing the shredded and dried dandelion roots in an extractor tank with water having a temperature of at least 40° C.;
   e) recycling the water through the extractor tank, wherein additional shredded and dried dandelion roots are added to the extractor tank until the concentration of inulin in the water reaches a predetermined amount;
   f) pumping the water having the predetermined amount of inulin through a filter to remove substantially all the shredded and dried dandelion roots, and into a holding tank;
   g) adjusting a pH of the water in the holding tank to below 4.0; and
   h) degrading the inulin in the holding tank to fructose.

2. The method of claim 1, further comprising the step of:
   i) maintaining the fructose that has been degraded from the inulin in the holding tank for a predetermined time;
   j) adjusting the pH of the water in the holding tank to between 6.0 and 8.0; and
   k) evaporating the fructose to a solid content of 20 weight % to 50 weight %.

3. The method of claim 2, wherein the fructose is mixed with a glucose solution before the step of evaporating.

4. The method of claim 1, wherein the step of adjusting a pH of the water in the holding tank to 1.5 comprises adding a sulfuric acid to the water.

5. The method of claim 2, wherein the step of adjusting the pH of the water in the holding tank to between 6.0 and 8.0 comprises adding a sodium hydroxide to the water.

6. The method of claim 1, wherein the dandelion species is selected from the group consisting of: *Taraxacum officianale, Taraxacum kok-saghyz*, a rubber-bearing species of the genus *Taraxacum*, and a combination of two or more thereof.

* * * * *